United States Patent
Tolliver et al.

(10) Patent No.: US 6,217,252 B1
(45) Date of Patent: Apr. 17, 2001

(54) WEAR-RESISTANT TRANSPORTATION SURFACE MARKING METHOD AND MATERIALS

(75) Inventors: Howard R. Tolliver; Suman K. Patel, both of Woodbury, MN (US); Thomas V. Kusilek, River Falls, WI (US); Nagraj Koneripalli, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/132,270

(22) Filed: Aug. 11, 1998

(51) Int. Cl.[7] .................... F16V 7/22; E01C 7/06; E01C 23/14

(52) U.S. Cl. ................ 404/77; 404/72; 404/79; 523/172

(58) Field of Search .................. 404/72, 75, 77, 404/79, 12; 523/172

(56) References Cited

U.S. PATENT DOCUMENTS

| | | | |
|---|---|---|---|
| Re. 28,531 | * 8/1975 | De Vries | 260/22 CB |
| 3,011,412 | 12/1961 | Harrington et al. | 94/1.5 |
| 3,279,336 | 10/1966 | Eaton et al. | 94/44 |
| 3,393,615 | 7/1968 | Micheln | 94/39 |
| 3,410,185 | 11/1968 | Harrington | 94/22 |
| 3,664,242 | 5/1972 | Harrington et al. | 94/22 |
| 3,849,351 | 11/1974 | Jorgensen | 260/18 N |
| 3,874,801 | 4/1975 | White | 401/2 |
| 3,897,378 | * 7/1975 | Scohy et al. | 260/22 CB |
| 3,900,605 | 8/1975 | Norris, Jr. | 427/137 |
| 3,914,468 | 10/1975 | Condon et al. | 427/137 |
| 3,928,266 | * 12/1975 | Scohy et al. | 260/22 CB |
| 3,935,365 | 1/1976 | Eigenmann | 428/323 |
| 4,058,641 | 11/1977 | Hnojewyj | 427/137 |
| 4,069,281 | 1/1978 | Eigenmann | 264/1 |
| 4,185,132 | * 1/1980 | Gurney | 427/137 |
| 4,296,006 | * 10/1981 | Bugdahl et al. | 260/23 EP |
| 4,324,711 | * 4/1982 | Tanaka et al. | 523/172 |

FOREIGN PATENT DOCUMENTS

| | | | |
|---|---|---|---|
| 0 260 870 | 3/1988 | (EP) | H01F/1/06 |
| 0 850 755 A1 | 7/1998 | (EP) . | |
| 5-33661 | 5/1993 | (JP) | B32B/27/18 |
| 9-314032 | 12/1997 | (JP) | B05D/1/08 |
| WO 96/16231 | 5/1996 | (WO) . | |
| WO 98/24853 | 6/1998 | (WO) | C09D/5/00 |

OTHER PUBLICATIONS

Information Folder 5.11 3M Green Lite™ Striper GLG–30 (publication 75–0299–9287–4(52.25)R1).

Acrylic Resins for Powder Coatings, *EuroCoat*, Jan. 2, 1994, pp. 14–23.

Aznar, A. C., Caprari, J.J., Meda, J.F., and Slutzky, O., "Study of Formulation Variables of Thermoplastic Reflecting Materials for Traffic Marking", Journal of Coatings Technology, 69, 868, pp. 33–38 (May 1997).

Andrady, A.L., "National Cooperative Highway Research Program Report 392, Pavement Marking Materials: Assessing Environment–Friendly Performance", Washington, D.C. (1997).

(List continued on next page.)

Primary Examiner—Eileen D. Lillis
Assistant Examiner—Gary S. Hartmann

(57) ABSTRACT

Flame-spray transportation surface marking method employing a binder material selected from the group consisting of acrylic polymers and copolymers, olefin polymers and copolymers having a number average molecular weight greater than about 10,000, urethane polymers and copolymers, curable epoxy resins, ester polymers and copolymers, and blends thereof, together with a particulate topcoat or particulate filler selected from the group consisting of reflective elements, skid-resistant particles, magnetizable particles, and mixtures thereof, wherein the binder adheres directly to the transportation surface.

9 Claims, 3 Drawing Sheets

U.S. PATENT DOCUMENTS

| | | | |
|---|---|---|---|
| 4,388,359 | | 6/1983 | Ethen et al. ................. 428/143 |
| 4,490,432 | | 12/1984 | Jordan ........................ 428/220 |
| 4,497,722 | | 2/1985 | Tsuchida et al. ............ 252/62.54 |
| 4,564,556 | | 1/1986 | Lange ......................... 428/325 |
| 4,758,469 | | 7/1988 | Lange ......................... 428/325 |
| 4,797,432 | * | 1/1989 | Cavitt ......................... 523/172 |
| 4,845,135 | * | 7/1989 | Cavitt ......................... 523/172 |
| 4,937,127 | | 6/1990 | Haenggi et al. ............. 428/148 |
| 5,094,902 | | 3/1992 | Haenggi et al. ............. 428/150 |
| 5,127,973 | | 7/1992 | Sengupta et al. ............ 156/60 |
| 5,194,113 | | 3/1993 | Lasch et al. ................. 156/243 |
| 5,374,465 | | 12/1994 | Fulcomer ..................... 428/122 |
| 5,417,515 | | 5/1995 | Hachey et al. ............... 404/15 |
| 5,453,320 | | 9/1995 | Harper et al. ............... 428/356 |
| 5,536,569 | | 7/1996 | Lasch et al. ................. 428/328 |
| 5,559,170 | | 9/1996 | Castle ......................... 523/223 |
| 5,571,362 | | 11/1996 | Hachey et al. ............... 156/264 |
| 5,709,948 | | 1/1998 | Perez et al. .................. 428/413 |
| 5,747,626 | * | 5/1998 | Krepski et al. .............. 528/28 |
| 5,750,191 | | 5/1998 | Hachey et al. ............... 427/163.4 |
| 5,928,761 | * | 7/1999 | Hedblom et al. ............. 428/143 |

OTHER PUBLICATIONS

"Green Lite™ Striping Powder and GLG–20 System"(publication 75–0299–7023–5).

"Green Lite™ Striping Powder" (publication 75–0299–7789–1 (120.5)ii).

"The 124 System" from Plastic Flamecoat Systems.

"Put on a PFS Coat" from Plastic Flamecoat Systems.

"Elvaloy® AM" (publication H–37622).

"3M and Zeelan Industries, Inc. Microspheres" (publication 70–0705–7642–9, 1994).

"3M and Zeelan Industries, Inc. Microspheres Performance Enhancements" (publication 70–0706–5903–5 (1995)).

Dow Chemical Product Brochure. "Primacore," Form No. 305–01618–489 (no date).

Poly–Carb, Inc. Product Brochure. "Long Life Pavement Marking System with Introductory Project Specification," Form No. LMGUMM17–27 (no date).

Morton International, Inc. Product Brochure. "Traffic Markings for the Road Ahead . . . ", (1986).

S. C. Johnson Polymer Product Brochure. "Coatings— Joncryl Selection Guide," (section on "Solid Grade Acrylic Resins for Hydroxyalkylamide Powder Coatings" and "Solid Grade Acrylic Resin for Hybrid Powder Coatings"), Form No. 21500–94–09 (no date).

AlliedSignal Product Brochure. "A–C Performance Additives," Form No. WXB–005 (no date).

Epoplex Product Brochure. "Epoplex LS5" (Mar. 1996).

Anderson Development Company Product Brochure. "Almatex™ Thermosetting Acrylic Resins for Powder Coatings" (Dec. 1994).

Eastman Chemical Company Product Brochure. "Raw Materials for Thermoplastic Pavement Striping Compounds," Form No. WA–56 (Aug. 1995).

ICI Acrylics Product Brochure. "Elvacite Acrylic Resins Properties and Uses," Form No. L–1039 (Aug. 1994).

Schwager, B. P., Statz, R. J., Scott, D. A., and Pelham, L., "A Novel Ethylene Copolymer for Asphalt Modification" (no date).

Search Report for PCT/US99/16237.

* cited by examiner

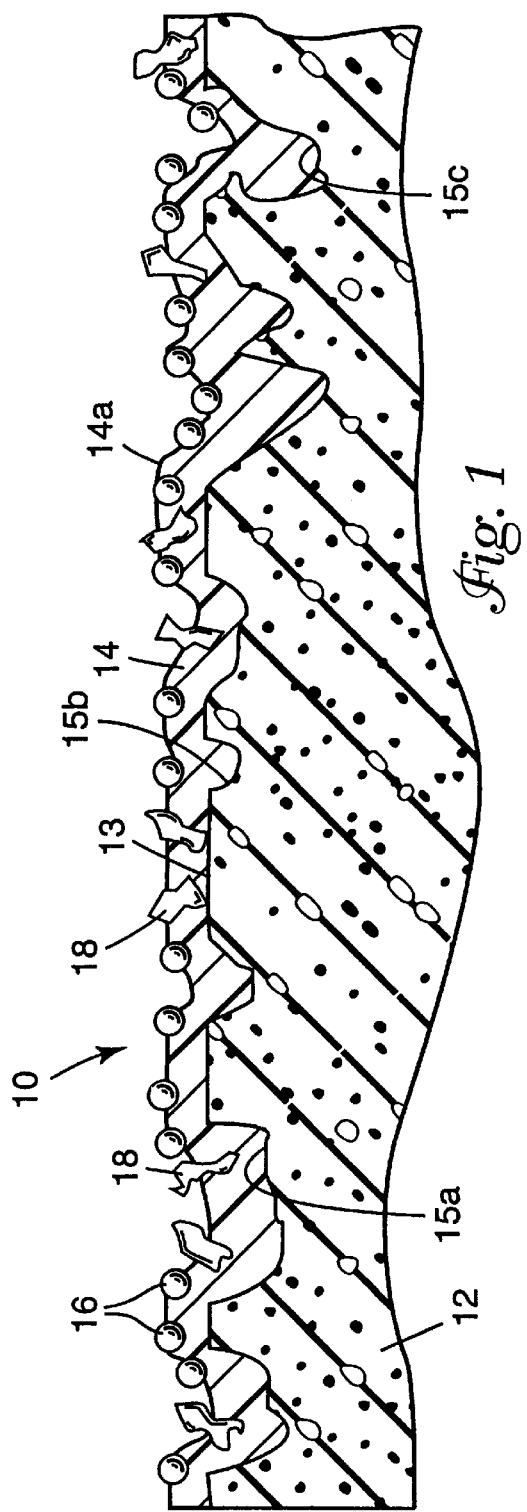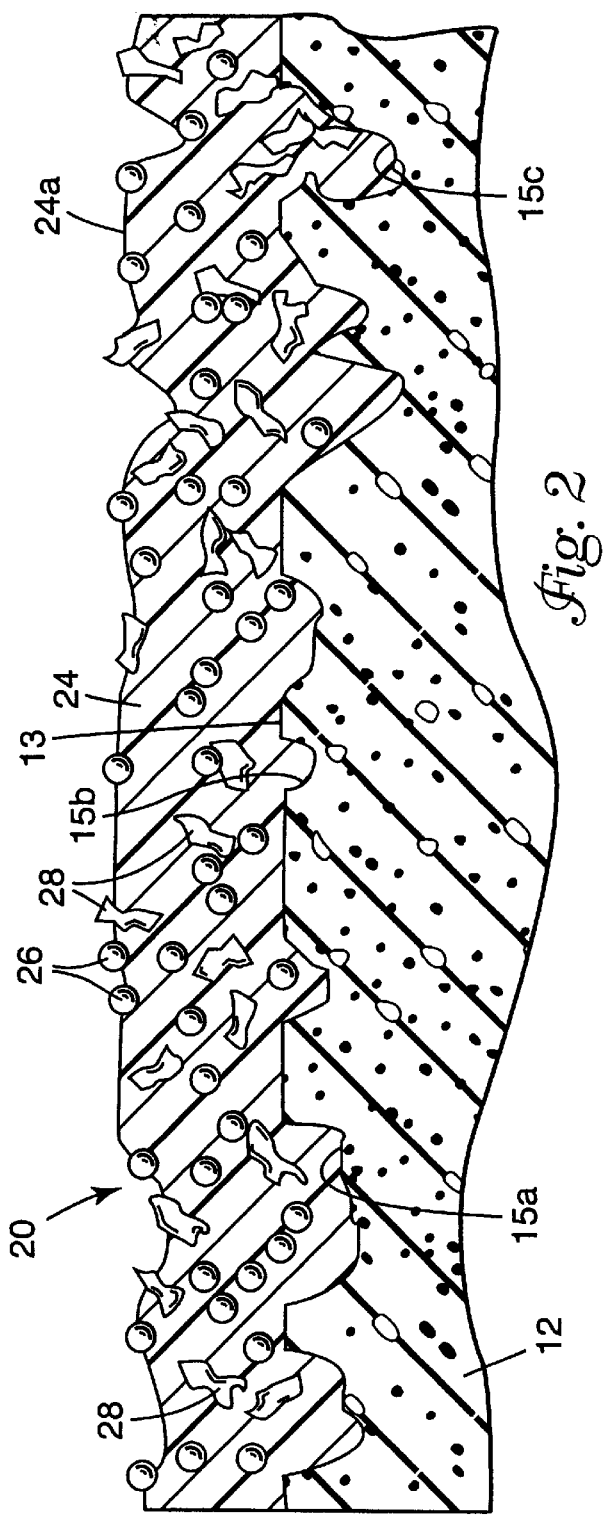

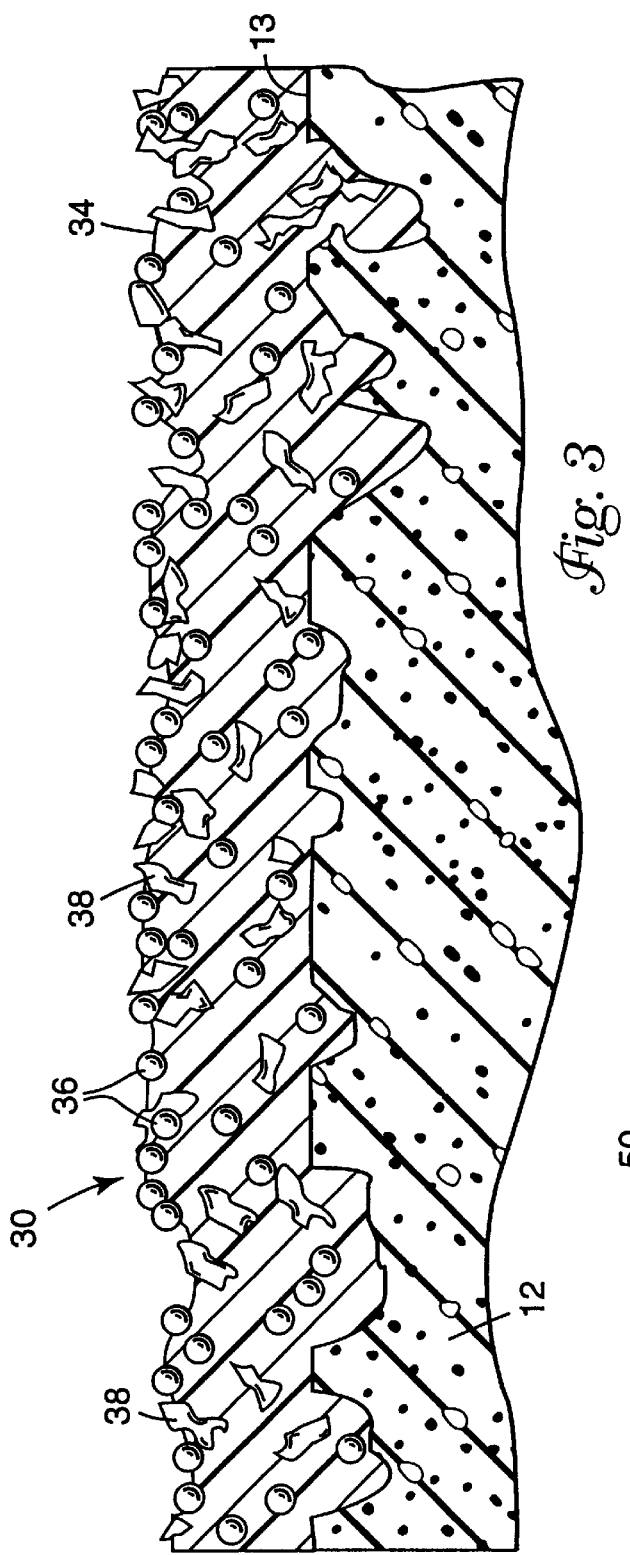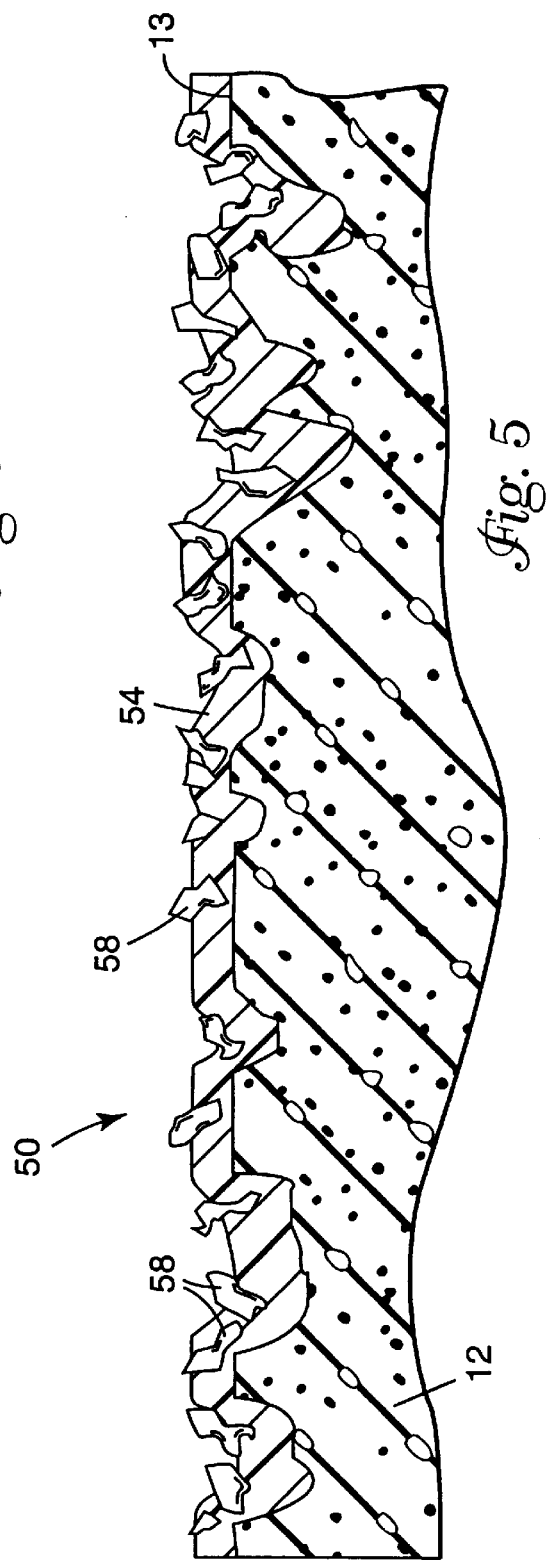

WEAR-RESISTANT TRANSPORTATION SURFACE MARKING METHOD AND MATERIALS

TECHNICAL FIELD

This invention relates to a method for marking transportation surfaces, and to wear-resistant compositions useful in such method.

BACKGROUND

Pavement marking systems that have been described in the patent literature or are commercially available include solvent-borne and water-borne paints, preformed adhesive tapes, preformed thermoplastic tapes, two-part reactive thermoset systems (e.g., epoxies and acrylates), hopper-borne molten thermoplastic systems and combustion flame-sprayed thermoplastic powder systems. The flame-sprayed thermoplastic systems are especially quick and easy to apply (even on roughened or cracked surfaces or under extreme low temperatures) and have relatively low cost. However, existing commercially-available flame-sprayed systems appear to be less durable than some commercially-available alternatives such as preformed tapes, and consequently may require more frequent replacement and greater long-term installation labor expense.

Aznar, A. C., Caprari, J. J., Meda, J. F., and Slutzky, O., "Study of Formulation Variables of Thermoplastic Reflecting Materials for Traffic Marking", Journal of Coatings Technology, 69, 868, pp. 33–38 (May 1997) describe typical thermoplastic pavement marking materials and their wear resistance using wet and dry Taber abrasion tests.

Andrady, A. L., "National Cooperative Highway Research Program Report 392, Pavement Marking Materials: Assessing Environment-Friendly Performance", Washington, D.C. (1997) describes several types of pavement marking materials, including typical formulations for commercially available pavement markings (see pp. 9–13 and 52–57).

U.S. Pat. No. 3,410,185 (Harrington '185), U.S. Pat. No. 3,664,242 (Harrington et al. '242), U.S. Pat. No. 3,849,351 (Jorgansen), U.S. Pat. No. 3,914,468 (Condon et al.), and U.S. Pat. No. 4,058,641 (Hnojewyj), and the brochures entitled "Green Lite™ Striping Powder and GLG-20 System" (publication 75-0299-7023-5) and "Green Lite™ Striping Powder" (publication 75-0299-7789-1 (120.5)ii) describe machines and compositions for use in flame-spray pavement marking applications.

Japanese published patent application (Kokai) No. HEI 9 [1997]-314032 describes flame-sprayable coatings for use on flood gates, valves and water pipes, liners, vanes and gates and other substrates but does not describe the use of such materials as pavement markings. An "acrylic type resin powder" and more specifically an "ethylene acryl acetate" is said to be employed, together with an alumina filler material.

The brochures entitled "The 124 System" and "Put on a PFS Coat" from Plastic Flamecoat Systems describe a handheld flame-spray applicator that can be used, inter alia, to line the interior of a pothole, and to seal and repair cracks, during asphalt repair procedures.

The brochure entitled "Elvaloy® AM" (publication H-37622) describes a reactive asphalt additive said to be an ethylene/glycidyl/acrylate terpolymer.

U.S. Patent No. 3,011,412 (Harrington et al. '412) describes a urea-based meltable temporary protective coating for thermoset or thermoplastic pavement marking paints.

Japanese patent (Kokoku) No. HEI 5[1993] - 33661 describes a preformed pavement marking tape made from a molded sheet containing a binder including an "ethylene methacrylic acid copolymer resin with 10 to 15 weight % methacrylic acid content", and bonded to pavement using a hot-melt adhesive which had been preapplied to the tape before use. No mention is made of flame-spraying the copolymer or the sheet ingredients onto pavement.

U.S. Pat. No. 4,069,281 (Eigenmann), U.S. Pat. No. 4,388,359 (Ethen et al.), U.S. Pat. No. 4,490,432 (Jordan), U.S. Pat. No. 5,127,973 (Sengupta et al.), U.S. Pat. No. 5,194, 13 (Lasch et al. '113), U.S. Pat. No. 5,374,465 (Fulcomer) and U.S. Pat. No. 5,536,569 (Lasch et al. '560) describe various preformed pavement marking materials which typically have one or more layers in the form of a primer, pressure sensitive adhesive or conformance material between the marker and the pavement.

SUMMARY OF THE INVENTION

The present invention provides, in one aspect, a method for marking a transportation surface comprising the steps of:

a) heating the surface to a temperature above ambient temperature;

b) melting or otherwise substantially softening a finely-divided, free flowing, flame-sprayable, powder binder material selected from the group consisting of acrylic polymers and copolymers, olefin polymers and copolymers having a number average molecular weight greater than about 10,000, urethane polymers and copolymers, curable epoxy resins, ester polymers and copolymers, and blends thereof, c) applying the molten or softened binder to the surface together with a particulate topcoat or particulate filler selected from the group consisting of reflective elements, skid-resistant particles, magnetizable particles and mixtures thereof;

d) optionally postheating the thus-applied materials; and e) allowing the thus-applied materials to cool and form a marker in which the binder adheres directly to the surface.

In another aspect, the invention provides a novel kit of components, useful in the above method, comprising one or more containers comprising finely-divided, free flowing, flame-sprayable, powder binder material selected from the group consisting of acrylic polymers and copolymers, olefin polymers and copolymers having a number average molecular weight greater than about 10,000, urethane polymers and copolymers, curable epoxy resins, ester polymers and copolymers, and blends thereof, together with a particulate topcoat or particulate filler selected from the group consisting of reflective elements, skid-resistant particles, magnetizable particles and mixtures thereof.

In yet another aspect, the invention provides novel transportation surface markers comprising a binder material selected from the group consisting of acrylic polymers and copolymers, olefin polymers and copolymers having a number average molecular weight greater than about 10,000, urethane polymers and copolymers, curable epoxy resins, ester polymers and copolymers, and blends thereof, together with a particulate topcoat or particulate filler selected from the group consisting of reflective elements, skid-resistant particles, magnetizable particles, and mixtures thereof, wherein the binder adheres directly to the transportation surface.

In yet a further aspect, the invention provides marked transportation surfaces bearing such markers.

The method and compositions of the invention can be used to prepare markers for transportation surfaces (e.g., intersection and lane pavement markings) having high wear resistance, rapid track-free time and minimal or no solvent emission. The novel kit of components is particularly suited for application using flame-spray equipment.

DESCRIPTION OF THE DRAWING

FIGS. 1–3 are enlarged cross-sectional views of skid-resistant retroreflective markers of the invention on concrete.

FIG. 5 is an enlarged cross-sectional view of a skid-resistant marker of the invention on concrete.

DETAILED DESCRIPTION

Figure 4:
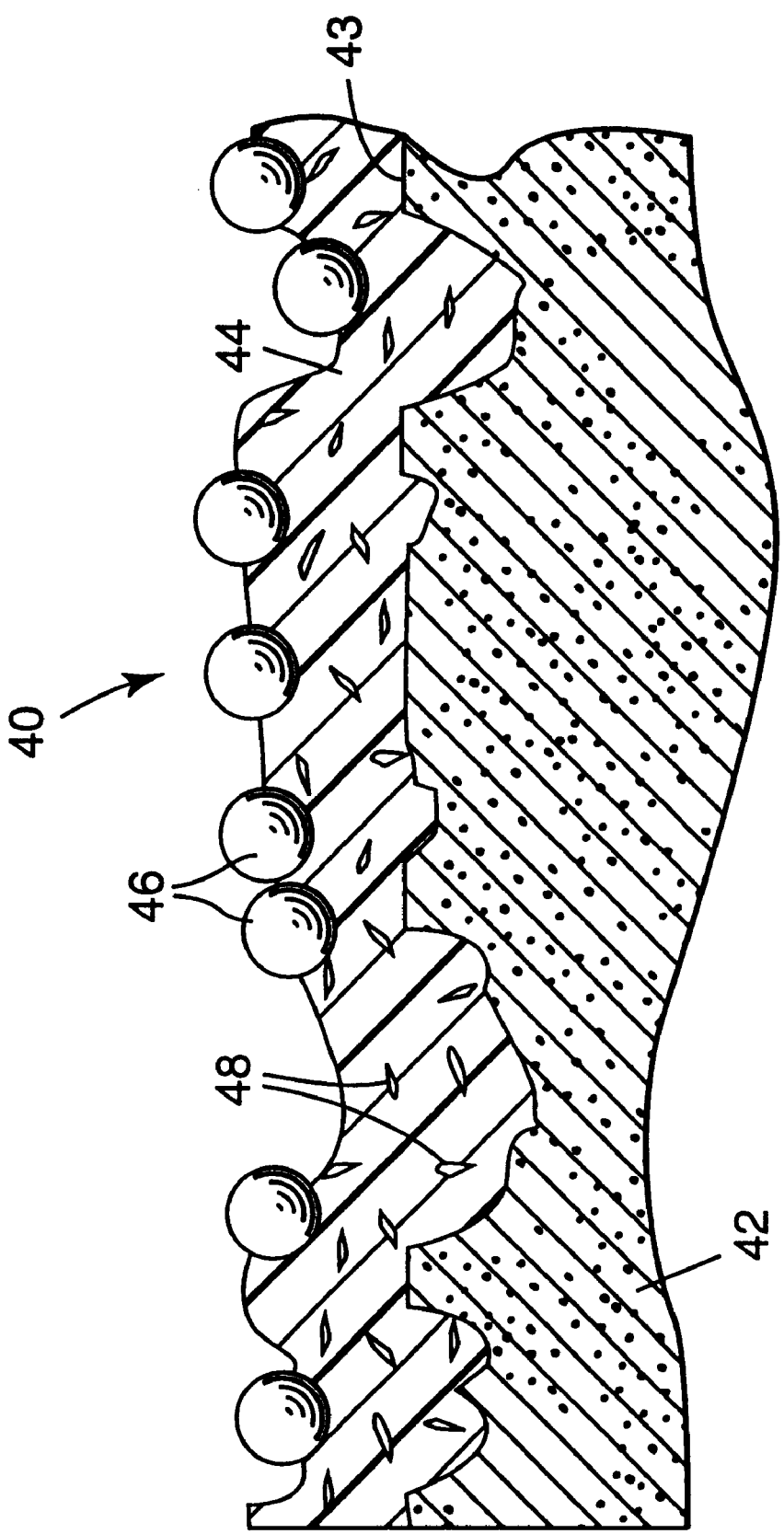
FIG. 4 is an enlarged cross-sectional view of a magnetizable retroreflective marker of the invention on asphalt.

Transportation surfaces to which the markers of the invention can be applied include roadways, walkways, bicycle paths, curbs, traffic barriers, barricades, steps, parking lots and other transportation-related horizontal, inclined or vertical surfaces made of concrete, asphalt, bricks and other hard materials. The markers can be in the form of any desired indicia including stripes, text, graphics and other symbols.

Referring to FIG. 1, retroreflective pavement marker 10 is adhered directly to pavement surface 13 of concrete 12 due to adhesion between solidified binder material 14 and pavement surface 13. This adhesion is obtained without the need for an intermediate adhesive layer such as a pressure-sensitive adhesive. Because surface 13 typically is non-planar, penetration of molten binder material 14 into the interstices 15a, 15b and 15c of surface 13 aids in adhering marker 10 to surface 13 following cooling of binder 14. On a horizontal transportation surface, the upper surface 14a of binder 14 generally follows the contours of interstices 15a, 15b and 15c. Reflective elements 16 and skid-resistant particles 18 lie atop marker 10. Marker 10 can be formed using relatively simple flame-spray equipment and is especially well suited to temporary markings where marker wear and the eventual loss of elements 16 and particles 18 would not be detrimental. Binder 14 can be applied to concrete 12 in the form of free flowing solid particles (not shown) that pass through the flame of a flame-spray apparatus (not shown) and thereby become molten or softened sufficiently to coalesce into a film on surface 13. Elements 16 and particles 18 are dropped onto the film while binder 14 remains in a softened or molten state.

Marker 20 in FIG. 2 resembles marker 10 but reflective elements 26 and skid-resistant particles 28 are distributed randomly throughout binder 24, and binder 24 is somewhat thicker than binder 14. Marker 20 is adhered directly to pavement surface 13 due to adhesion between solidified binder 24 and pavement surface 13. On a horizontal transportation surface, the upper surface 24a of binder 24 generally follows the contours of relatively deep depressions such as interstices 15a and 15c, but is generally planar over relatively shallow depressions such as interstice 15b owing to the tendency of binder 24 to flow and self-level prior to resolidification. Marker 20 can be made using several different techniques that achieve substantially uniform mixing of the reflective elements 26, skid-resistant particles 28 and binder 24 before the mixture reaches the surface 13. For example, reflective elements 26, skid-resistant particles 28 and binder 24 can be separately fed to the flame-spray apparatus and combined at or in the flame. These ingredients can also be dry-blended together well beforehand, stored in a container, and then fed as a mixture to the flame. As a further example, reflective elements 26 or skid-resistant particles 28 can be combined with molten binder 24 and the resulting mixture cooled and ground or otherwise converted into powder form. The resulting powder blend can later be mixed with any remaining desired particles in the flame-spray apparatus. Marker 20 has a desirable combination of long-term retroreflectivity and skid resistance while the marker wears away.

Marker 30 in FIG. 3 has features of both markers 10 and 20. A relatively dense coat of reflective elements 36 and skid-resistant particles 38 lies atop marker 30. In addition, further reflective elements 36 and skid-resistant particles 38 are distributed randomly throughout binder 34. Marker 30 is adhered directly to pavement surface 13 due to adhesion between solidified binder 34 and pavement surface 13. Marker 30 can be made by combining the techniques used to make markers 10 and 20. Marker 30 provides a good level of initial retroreflectivity and skid resistance, together with reasonable levels of these characteristics as marker 30 wears away.

Magnetizable retroreflective marker 40 in FIG. 4 is topcoated with reflective elements 46 and contains magnetizable particles 48 distributed randomly throughout binder 44. Marker 40 is adhered directly to pavement surface 43 of asphalt 42 due to adhesion between solidified binder 44 and pavement surface 43. Marker 40 can provide both visual and magnetically-sensed information to a motorist and vehicle owing to the presence of reflective elements 46 and magnetizable particles 48.

Skid-resistant marker 50 in FIG. 5 is topcoated with skid-resistant particles 58. Marker 50 is adhered directly to pavement surface 13 of concrete 12 due to adhesion between solidified binder 54 and pavement surface 13. Marker 40 helps provide safer conditions for pedestrians and cyclists by discouraging slippage by people walking or riding over marker 50 in wet or dry conditions.

Although not shown in the Drawing, the marker can if desired be formed from two or more built-up layers. For example, graphic symbols (e.g., parking space markers for disabled motorists) can be formed by application of a blue rectangular background followed by application of a white wheelchair symbol in the center of the rectangle (using, e.g., a heat-resistant stencil or other suitable image-producing technique), leaving part of the lower layer visible. As a further example, the marker can be overcoated with an upper layer having more wear-resistant properties than the lower layer. Preferably this upper layer contains a binder of the type used in the markers of the invention, although other coatable polymeric materials or even tape constructions can be used for the upper layer if desired.

The method of the invention can be carried out using typical commercially-available flame-spray equipment for pavement marking applications, such as the devices described in U.S. Pat. No. 3,279,336 (Eden et al.), U.S. Pat. No. 3,393,615 (Micheln), and U.S. Pat. No. 3,874,801 (White), and in the brochure entitled "Information Folder 5.11 3M Green Lite™ Striper GLG-30" (publication 75-0299-9287-4(52.25)R1). Preferably such devices employ an air-propane combustion system, and provide or are modified to provide reliable control of process variables such as machine speed, ingredient flow rates, transportation surface preheat temperature, flame size and shape, and material residence time in the flame. For example, by using fluidized powder feed mechanisms such as those employed in the TECFLO Model 5102 or TECFLO 3500 Model E powder delivery systems (commercially available from Eutectic corporation), the delivery rate of binder powder into the flame can be reliably controlled.

Flame-spray equipment for ordinary industrial coating applications can also be employed if desired, especially when precise coating thickness control is not required. Suitable equipment includes air-propane powder coating applicators such as the TERODYN/TECFLO Model 3500 air/propane flame-spray system (commercially available from Eutectic Corporation) and the Model 124 flame-spray system (commercially available from Plastic Flamecoat Systems).

Preferably the transportation surface is first cleaned using any suitable cleaning means such as a compressed air stream, broom, wire brush, or degreaser, to remove loosely held dirt, sand, gravel or other surface contaminants if present. New concrete pavement preferably is scarified using an abrader or other suitable device to remove curing additive residues and other surface deposits.

The transportation surface should be preheated before the marker ingredients are applied to the surface, to drive off surface moisture or other fluids (e.g., automotive lubricants and hydraulic fluids) if present, and to aid in binder film coalescence. Useful preheating temperatures can be as high as or higher than the melting range or softening temperature of the binder powder, and preferably are between about 65° and about 300° C. Preheating typically can be accomplished using any suitable heat source, including flames and infrared, microwave or radiant electric heating elements. Preferably, preheating is accomplished using the primary (or if desired a secondary) flame from the flame-spray machine.

Typically, a marker of the invention formed on a horizontal transportation surface will have a generally planar upper binder surface, interrupted by depressions into large interstices in the transportation surface, and optionally interrupted by projections from any reflective elements, skid-resistant particles or magnetizable particles that may have been topcoated onto the marker. Markers formed on non-horizontal transportation surfaces can vary in thickness due to the effect of gravity while the molten binder cools. When the transportation surface contains gross defects such as deep cracks or other depressions, the ability of the marker to conform to such defects can provide a substantial durability advantage over preformed adhesive tapes.

The powder(s) from which the marker is made preferably are applied at a rate sufficient to yield a coating thickness having sufficient durability to withstand at least one season of typical outdoor exposure. For pavement marking applications, the markers of the invention preferably will withstand at least about three seasons of normal traffic exposure, and most preferably about five seasons or more. Translated into dimensional units, the desired marker thickness will vary depending upon environmental and traffic conditions and upon the particular formulation employed, but typically will be about 0.13 to about 2 mm, more preferably about 0.25 to about 1.5 mm, and most preferably about 0.5 to about 0.75 mm. These thicknesses can be less than the thicknesses typically required for some widely used alternative transportation surface marking materials. For example, the recommended thickness to provide adequate wear resistance for alkyd thermoplastic intersection markings is about 2.3 to 3 mm.

The thickness of markers of the invention will primarily depend upon the marker size (e.g., the stripe width for a lane marking), the powder delivery rate, and the rate at which the flame-spray machine traverses the transportation surface. This traversal rate will be referred to as the "machine speed". Preferably, the machine speed is at least about 3 meters per minute, and more preferably about 9 to about 27 meters per minute. As an example, if the marker has a specific gravity of 1.5 $g/cm^3$ and is applied in a 300 mm wide stripe at a machine speed of 3 meters per minute, then a marker thickness of 0.5 to 0.75 mm will be obtained at a powder delivery rate of about 41 to 61 Kg per hour. Typically an equipment designer or operator may need to optimize other machine settings such as the flame size or the residence time of the powder(s) in the flame. Preferably these settings are optimized by the designer to suit a particular formulation, and need not thereafter be adjusted by the operator. Use of multiple powder feeders can increase powder delivery rates to the flame. Use of multiple flame heads can increase powder delivery rates to the transportation surface. Such multiple flame heads can be arranged in parallel or serial fashion with respect to the direction of flame-spray machine travel.

If desired, the marker can be further heated following application to the transportation surface, using, e.g., heat sources such as those used for preheating. This postheating heating step can aid in binder film coalescence, formation of a durable, well-adhered marker, and enhancement of particle/binder adhesion in topcoated markers.

Following application, the marker should be allowed to cool so that the solidified binder material becomes tack-free. Adequate adhesion of the marker to the transportation surface can be evaluated in a variety of ways. Exposure to normal environmental or traffic conditions for a period of time, e.g., one day or more, will give the most reliable test results. However, relatively simple tests such as a boot scuff test or attempting to remove the marker with a putty knife will often be sufficient to determine whether marker has adhered adequately to the transportation surface. In cases where the marker has been applied to asphalt, it may be necessary to allow the asphalt to cool for several hours or more before evaluating adhesion. Asphalt can retain significant heat from the preheating step and may undergo cohesive failure within the asphalt if marker adhesion is tested too soon after the marker has been applied.

The kits of the invention include one or more containers of ingredients in finely-divided form. At least one of the containers contains the above-mentioned flame-sprayable binder powder, either alone or combined with one or more of the reflective elements, skid-resistant particles or magnetizable particles. For markers in which the ingredients are uniformly distributed throughout the marker, all of the included ingredients preferably are present in a single container. The kit ingredients can also include one or more adjuvants (described in more detail below). These adjuvants can be melt-compounded into the binder, or included in the kit as discrete or dry-blended ingredients.

Although the markers of the invention are preferably made by flame-spraying, they can if desired be made using other means. For example, the marker ingredients can be mixed, melted in a kettle or other heating vessel, transported if need be to the application site (using e.g., a wheeled hopper) and coated onto the transportation surface, using techniques similar to those used for applying conventional hydrocarbon thermoplastic long-line markings or alkyd thermoplastic intersection markings. Also, the marker ingredients can be mixed, melted, pressed into a film, cooled, and later reheated and applied directly to the transportation surface using a torch or other localized heating device, using techniques similar to those used for applying preformed thermoplastic intersection markings such as PREMARK preformed marking tape (commercially available from Flint Trading, Inc.).

The binder is selected from the group consisting of acrylic polymers and copolymers, olefin polymers and copolymers having a number average molecular weight greater than about 10,000, urethane polymers and copolymers, curable epoxy resins, ester polymers and copolymers, and blends thereof. Before use, the binder (and any other commingled ingredients such as skid-resistant particles or adjuvants) should be free flowing. By this is meant that when the binder is stored and used under ordinary warehousing and roadside conditions, it can be poured into the powder storage hopper (s) of the flame-spray machine and will pass through the machine and the flame without excessive caking, clogging, or adhesion to parts of the flame-spray machine upstream from the flame.

The binder should be flame-sprayable. By this is meant that the binder particles do not burn or otherwise unduly degrade when passed through the flame of the desired flame-spray machine, and that they melt or soften sufficiently when so passed and coalesce into a film upon application to the transportation surface. Flame-sprayability can be evaluated empirically. A number of factors are involved, including the binder molecular weight, adjuvant type and loading level, powder particle size, preheat temperature, powder residence time in the flame, and the extent of postheating. Melt index measurements are a useful technique for evaluating binders without having to flame-spray finished formulations. Using the measurement technique described in ASTM D-1238, preferred flame-sprayable binder materials typically have melt indices above about 80, more preferably above about 200, and most preferably above about 500.

The binder preferably is a thermoplastic powder. The binder can be a thermosettable powder if it is capable of being softened in the flame-spray apparatus and coalescing into a film before appreciable thermosetting occurs. Such thermosettable binders can be prepared using two part reactive systems, one part systems containing thermally-activated crosslinking agents, or other means by which once the binder particles have been heated in the flame, allowed to coalesce into a film, and cool and solidify, the binder will have a higher melting point, lower melt index, reduced solubility or other indication of thermoset properties. The binder can also be a blend of thermoplastic and thermosettable materials (including liquid materials, e.g., liquid thermosettable materials) so long as the blend is a powder. Binders made from either solid or liquid thermosettable materials preferably are melt compounded and pulverized at sufficiently high temperatures to facilitate mixing of the ingredients and production of a flame-sprayable powder, without initiating thermosetting of the binder. This enables the thermosetting reaction to be substantially deferred until the powder is delivered to the flame or otherwise heated just prior to formation of the marker on the transportation surface. Thermosetting can then take place as (or after) the marker forms and cools on such surface.

Suitable acrylic polymers and copolymers contain repeating units derivable from acrylic acid or methacrylic acid, and include polymers of monomers such as methyl methacrylate, ethyl methacrylate, n-butyl acrylate, n-butyl methacrylate, ethyl hexyl acrylate, hydroxyethyl acrylate, hydroxyethyl methacrylate, acrylic acid, methacrylic acid, styrene, methyl styrene and glycidyl acrylate. Industrially available versions of such acrylic polymers and copolymers include JONCRYL SCX-815, -817 and -819 carboxyl-functional acrylic resins (commercially available from SC Johnson Polymer, and optionally crosslinkable using a hydroxyalkylamide crosslinker such as PRIMID XL-552, commercially available from EMS-Chemie), ALMATEX epoxy-functional thermosetting acrylic resins (commercially available from Anderson Development Company and Mitsui Toatsu Chemicals, Inc, and optionally crosslinkable using 1,12-dodecanedioic acid), ELVACITE grades 2008, 2013, 2016, 2028 and 2043 methacrylate resins (commercially available from ICI Acrylics), and ACRYLOID B-66 methyl/butyl methacrylate polymer (commercially available from Rohm & Haas)

Suitable olefin polymers and copolymers are non-grease, non-wax materials containing repeating units derivable from olefinic monomers, and include ethylene acrylic acid copolymers, ethylene methacrylic acid copolymers (including ionically-crosslinkable ethylene methacrylic acid copolymers), polyethylene plastics, polypropylene, ethylene-propylene-diene terpolymers, polybutylene, ethylene n-butyl acrylate, ethylene maleic anhydride copolymers, ethylene vinyl acetate, and ethylene methyl acrylate and ethylene ethyl acrylate copolymers. Industrially available versions of such olefin polymers and copolymers include PRIMACOR ethylene acrylic acid copolymers (commercially available from Dow Chemical Co.); NUCREL ethylene methacrylic acid copolymers, SURLYN ionically-crosslinkable ethylene methacrylic acid copolymer and ELVALOY AM ethylene/glycidyl/acrylate terpolymers (all commercially available from E. I. duPont de Nemours); and A-C 573A ethylene-maleic anhydride copolymer (commercially available from Allied Signal).

Suitable urethane polymers and copolymers contain repeating urethane linkages and aromatic or aliphatic groups or segments. Where weatherability is required, aliphatic (and preferably cycloaliphatic) groups or segments are preferred. Industrially available urethane polymers and copolymers include L-430.77-3 and -4 thermoplastic polyurethanes (experimentally available from Morton International, Inc.).

Suitable curable epoxy resins contain epoxy groups and aromatic or aliphatic groups or segments. Where weatherability is required, aliphatic (and preferably cycloaliphatic) groups or segments are preferred. Industrially available curable epoxy resins include SCOTCHKOTE 413 fusion-bonded epoxy coating material (commercially available from 3M) and EPON 1001F aromatic solid epoxy resin (commercially available from Shell Chemical Co.)

Suitable ester polymers contain repeating ester units and aromatic or aliphatic groups or segments. The ester polymer or copolymer can be a linear, non-crosslinkable material. If desired, the ester polymer or copolymer can contain one or more crosslinkable functional groups (such as carboxyl or hydroxyl groups), and can be hardened using a crosslinking agent such as triglycidyl isocyanurate ("TGIC"). Other suitable crosslinking agents include aminoplasts such as melamine formaldehydes, blocked aliphatic isocyanates and n,n-tetra(alkyloxy)methyl bis-alkyl amide. Industrially available ester polymers and copolymers include those described in "Acrylic Resins for Powder Coatings", *EuroCoat*, 1-2/1994, pp 14–23. A relatively wide variety of polyester resins can be employed, from suppliers such as Bostic Chemicals, Eastman Chemicals, DSM Resins US, Inc., Hoechst, McWhorter Technologies, Inc., Reichhold Chemicals, Inc., Ruco Polymer Corp., and UCB Chemicals Corp.

Blends of binder materials can be employed. This will facilitate the optimization of properties such as pavement surface adhesion, flame-sprayability, binder melt flow, film coalescence and marker wear resistance. Useful blends include mixtures of acrylic polymers or copolymers with urethane or ester polymers and copolymers, and other mixtures of thermosettable and thermoplastic binder materials. For example, curable epoxy resins can usefully be blended with one or more of the above-mentioned polymers or copolymers, e.g., polyolefins such as polypropylene. Suitable epoxy-olefin blends are also described in U.S. Pat. No. 5,709,948 (Perez et al.).

An especially useful blend can be prepared by dry-blending a curable epoxy resin powder with an olefin polymer or copolymer powder. Care should be taken to adjust the particle size distribution of such a blend to discourage separation of the powder in the flame-spray hopper. Finely-divided adjuvants (e.g., $TiO_2$) are preferably melt-compounded into the epoxy or olefin before the epoxy and olefin powders are dry-blended. This provides a cost-effective mixture of powders that can be flame-sprayed onto a transportation surface.

The desired binder particle size will vary somewhat depending on the chosen binder. As a generalization, the binder particles preferably have an average particle diameter of less than about 300 μm, more preferably less than about 200 μm, and most preferably about 100 to about 150 μm. The range of usable binder particle diameters can however lie outside these desired average diameter ranges.

The binder particles can have any desired shape including spheroids, flakes, fibers or irregular granules, with the shape being somewhat dependent upon the method used to convert the binder to a powder form. Spheroidal particles are preferred in order to facilitate more uniform melting or softening of the binder in the flame. Usually the binder can be pulverized by grinding, optionally aided by using cryogenic cooling or other particle-forming aids that make the binder more friable. Typical powder-forming equipment includes hammer mills, opposed fluid jet mills, and the like.

A variety of reflective elements can be employed, including glass beads formed of glass materials having indices of refraction (n) from of about 1.5 or more, more preferably from about 1.5 to about 2.26, and most preferably about 1.5 to about 1.9. Additional useful retroreflective elements include the beads disclosed in U.S. Pat. No. 4,564,556 (Lange '556) and U.S. Pat. No. 4,758,469 (Lange '469). These beads are described generally as solid, transparent, non-vitreous, ceramic spheroids having at least one metal oxide phase. They are very resistant to scratching and chipping, are quite hard (e.g., above 700 Knoop), can be made with a relatively high index of refraction (e.g., from 1.4 to 2.6), and preferably are made from zirconia-alumina-silica or zirconia-silica phases. Other suitable reflective elements include the reflective elements described in U.S. Pat. No. 5,417,515 (Hachey et al. '515), U.S. Pat. No. 5,571,362 (Hachey et al. '362) and U.S. Pat. No. 5,750,191 (Hachey et al. '191); Class "A" and Class "B" glass beads (commercially available from Potters-Ballotini); and "High Index" and "Traffic Marking" glass beads (commercially available from Flex-O-Lite, Inc.). Mixtures of reflective elements can be used if desired. The reflective elements can optionally be treated with a keying agent (e.g., 3-aminopropyltriethoxy silane or gamma-methacryloxypropyltrimethoxy silane) to enhance retention of the reflective elements within the marker. The reflective elements should be employed in an amount sufficient to provide the desired degree of visibility to vehicle drivers or other persons approaching the marker. Reflective performance typically will diminish as the marker ages and wears away. For markers in which reflective elements are distributed uniformly throughout the marker, amounts up to about 40 weight percent reflective elements are preferred, more preferably about 5 to about 35 weight percent and most preferably about 10 to about 30 weight percent. For markers bearing a particulate topcoat of reflective elements, coating weights up to about 0.2 $Kg/m^2$ are preferred, more preferably about 0.04 to about 0.17 $Kg/m^2$, and most preferably about 0.08 to about 0.13 $Kg/m^2$.

The reflective elements can have any desired shape, with spheroidal shapes being preferred.

The reflective element particles, if present as a separate kit ingredient, preferably have an average particle diameter less than about 1 mm, more preferably less than about 500 μm, and most preferably about 30 to about 350 μm.

Suitable skid-resistant particles include fused aluminum oxide (including alumina-zirconia), ceramic aluminum oxide, quartz (e.g., sand), silicon carbide, garnet, diamond, cubic boron nitride, boron carbide, chromia, ceria and combinations thereof Additional skid-resistant particles include the skid-resistant ceramic spheroids described in U.S. Pat. No. 4,937,127 (Haenggi et al. '127) and 5,094,902 (Haenggi et al. '902). Mixtures of skid-resistant particles can be employed if desired. The skid-resistant particles can optionally be treated with a keying agent such as those described above to enhance retention of the skid-resistant particles within the marker.

The skid-resistant particles can have any desired shape, with irregular shapes being preferred.

The skid-resistant particles should have a size and be employed in an amount sufficient to provide the desired level of skid resistance in a freshly flame-sprayed marker. Skid resistance can be evaluated as described in ASTM E303-93. The type, size and amount of skid-resistant particles are selected to provide a marker having surface frictional properties of at least about 45 British Pendulum Number (BPN) when so evaluated. The majority of the skid-resistant particles should have a particle diameter greater than 150 μm. Preferably the particles have a particle diameter between about 300 and about 1500 μm. For alumina particles, diameters between about 300 and about 1200 μm are preferred. For ceramic spheroids, diameters between about 420 and about 1400 μm are preferred. Skid resistance typically will diminish as the marker ages and the skid-resistant particles wear away. For markers in which skid-resistant particles are distributed uniformly throughout the marker, amounts up to about 15 weight percent skid-resistant particles are preferred, more preferably about 2 to about 7 weight percent. For markers bearing a particulate topcoat of skid-resistant particles, coating weights up to about 0.2 Kg/m2 are preferred, more preferably about 0.04 to about 0.17 $Kg/m^2$, and most preferably about 0.08 to about 0.13 Kg/m2.

A variety of magnetizable particles can be employed. The particles should be capable of being permanently magnetized, and many such particles are known to those familiar with the magnetic materials art. The major axis length (defined as the maximum length in any direction) of preferred magnetizable particles for use in this invention ranges from about 1 millimeter down to about 10 nanometers, and more preferably from about 200 micrometers down to about 0.1 micrometer. The saturation magnetization of the magnetic particles preferably ranges from about 10 to about 250 emu/g (electromagnetic units/gram), and more preferably is greater than about 50 emu/g. The coercivity of such particles preferably ranges from about 100 to about 20,000 Oersteds, more preferably from about 200 to about 5000 Oersteds. Particles with coercivities less than about 200 Oersteds are too easily accidentally demagnetized, while particles with coercivities greater than 5000 Oersteds require relatively expensive equipment to become fully magnetized.

Rare earth-metal alloy materials represent one suitable class of high-performance permanently magnetizable particles. These are further described in U.S. Pat. No. 4,497,722 (Tsuchida et al.), which describes the use of samarium-cobalt alloy particles, and European Patent Application No. 260,870, which describes the use of neodymium-iron-boron alloy particles. However, these alloys are relatively costly, may experience excessive corrosion under conditions of prolonged outdoor exposure, and typically have coercivities greater than 5000 Oersteds.

Other magnetizable particles include Alnico (aluminum-nickel-cobalt-iron alloy), iron, iron-carbon, iron-cobalt, iron-cobalt-chromium, iron-cobalt-molybdenum, iron-cobalt-vanadium, copper-nickel-iron, manganese-bismuth, manganese-aluminum, and cobalt-platinum alloys.

Magnetic ferrites represent one preferred class of magnetizable particles. The hexagonal phase of the magnetoplumbite structure (commonly known as barium hexaferrite, and generally produced as flat hexagonal platelets) is particularly preferred. Strontium and lead can substitute in part or completely for the barium, and many other elements can partially substitute for the iron. Thus strontium hexaferrite is also a preferred material. Another class of preferred magnetizable particles is the cubic ferrites, which are sometimes produced as cubic particles, but more often as elongated needle-like, or acicular, particles. Examples include magnetite ($Fe_3O_4$), magnemite or gamma ferric oxide (gamma-$Fe_2O_3$), intermediates of these two compounds, and cobalt-substituted modifications of the two compounds or of their intermediates. All of these magnetic ferrites are produced in large quantities at relatively low cost and are stable under conditions of prolonged outdoor exposure. Their coercivities typically lie within the above-mentioned most preferred range of 200 to 5000 Oersteds.

Additional preferred magnetizable particles include iron oxide, manganese-bismuth and iron protected against oxidation.

Chromium dioxide may also be useful as a magnetizable particle due to its low Curie temperature, which facilitates thermoremanent magnetization methods.

For markers containing magnetizable particles, the particles preferably are uniformly distributed throughout the marker at a relatively high loading level. A preferred loading range is up to about 85 weight percent, more preferably from about 65 to about 85 weight percent, and most preferably from about 75 to about 85 weight percent. To obtain the highest remanent magnetization, the magnetizable particles preferably are substantially domain-size, anisotropic particles, and there preferably is substantially parallel alignment of preferred magnetic axes of a sufficient number of the particles so as to make the marker anisotropic. The orientation of the magnetizable particles may be optimized by physically or magnetically orienting the particles, e.g., by calendering or through the use of an electromagnet.

If desired, adjuvants such as dry flow aids (e.g., fumed silica); melt flow additives (e.g., benzoin); pigments (e.g., titanium dioxide, lead-free yellow, carbon black, and fluorescent pigments); dispersing aids; impact modifiers (e.g., core-shell materials such as the PARALOID series of acrylic shell impact modifiers having butyl acrylate or methacrylate/butadiene/styrene cores, commercially available from Rohm & Haas); extenders and reinforcing fillers (e.g., calcium carbonate, alumina having particle diameters less than 150 $\mu$m, wollastonite, glass fibers, and the substantially glassy particles described in U.S. Pat. No. 5,559,170 (Castle) and in the brochures entitled "3M and Zeelan Industries, Inc. Microspheres" (publication 70-0705-7642-9, 1994) and "3M and Zeelan Industries, Inc. Microspheres Performance Enhancements" (publication 70-0706-5903-5, 1995)); anti-oxidants (e.g., IRGANOX 1010, commercially available from Ciba Geigy Inc.); flame retarders; adhesion aids; UV absorbers; and light stabilizers (e.g., CHIMASSORB 944 hindered amine light stabilizer, commercially available from Ciba Geigy Inc.) can be added to the kit compositions of the invention. Very finely divided adjuvants such as titanium dioxide typically will be added to the binder before carrying out grinding or other pulverization of the binder to powder form. Dry flow aids typically will be added to the binder after pulverization. Other adjuvants typically can be added to the binder before or after pulverization, with addition before pulverization being preferred. The amounts and types of adjuvants can be determined empirically, and will in general depend on the desired end use and environmental or traffic conditions to which the marker will be subjected.

The markers of the invention can be used in a variety of transportation applications, including temporary or permanent markings for lane dividers, channelization markings, stop bars, crosswalk rails, continental blocks, zebra stripes, parking lot stripes, curb markers, bike path markers, and other typical transportation surface symbols and legends (e.g., arrows and textual or numeric data). The method of the invention can be used to form new markers and to make repairs of existing markers. Typically the markers of the invention will be located within about 100 meters of a traffic intersection, but they can also be used in long-line applications and non-roadway applications when desired. The markers can contain two or more layers, with at least the layer adjacent the transportation surface containing one or more of the above-described binders adhered directly to such surface.

The invention is further illustrated in the following examples.

EXAMPLE 1

A mixture of 76 volume % ethylene acrylic acid copolymer (PRIMACOR 5990 copolymer, commercially available from Dow Chemical Co.), 8 volume % $TiO_2$ (R960, commercially available from E. I. duPont de Nemours & Co.), and 17 volume % alkali alumino silicate ceramic microspheres (No. W410 ZEEOSPHERES ceramic microspheres, commercially available from 3M) was compounded in a twin screw extruder. The extrudate was broken into small pieces, cooled with liquid nitrogen, and ground in a No. 88B Jacobson Mill (Jacobson Machine Works, Inc.). The ground particles were classified on a screen to remove particles having a diameter greater than about 600 $\mu$m. Glass beads (refractive index 1.5 Traffic Marking beads from Flex-O-Lite) were added to the classified powder by dry blending until they represented 19.6 volume % of the resulting mixture. The mixture had a calculated specific gravity of 1.64 and contained copolymer, glass beads, ceramic microspheres and $TiO_2$ in a 60.8:19.6:13.3:6.4 volume ratio. The mixture was flame-sprayed to a thickness of about 1.25 mm onto aluminum panels using a GREEN LITE Model GLG-20 Striping Machine (commercially available from 3M).

In a series of comparison runs, several commercially available pavement marking materials were applied to aluminum panels. The marker material in Comparison Example 1 was a polyamide-based flame-spray powder (GREEN LITE 2110 powder, commercially available from 3M). The marker material in Comparison Example 2 was an alkyd thermoplastic intersection material intended for hot-applied hopper-borne application (DURALINE thermoplastic, commercially available from Morton International, Inc.). This material was heated on a hot plate and poured onto a silicone-coated release paper. The resulting film was allowed to cool, pressed to a thickness of about 1.27 mm using an IHI Model PW-2204 press heated at a temperature of about 145° C., and hot-laminated to an aluminum panel.

observation of the marker following the eleven month period indicated that the marker exhibited no visible wear in the tire track area. Some loss due to adhesion failure occurred in the oil drip area, but overall over 95% of the original marker appeared to be intact.

TABLE 1

| Example or Comparison Example No. | Calculated Specific Gravity, g/cm$^3$ | Volume loss, 0–500 Cycles, cm$^3$ | Volume Loss, 500–1000 Cycles, cm$^3$ | Volume Loss, 1000–1500 Cycles, cm$^3$ | Volume Loss, 1500–2000 Cycles, cm$^3$ | Volume Loss, 2000–2500 Cycles, cm$^3$ | Total Volume Loss, cm$^3$ |
|---|---|---|---|---|---|---|---|
| Example 1 | 1.64 | 0.12 | 0.030 | 0.16 | 0.24 | 0.17 | 0.72 |
| Comparison Example 1[1] | 1.48 | 0.32 | 0.30 | 0.30 | 0.36 | 0.45 | 1.7 |
| Comparison Example 2[2] | 2.02 | 0.24 | 0.37 | 0.59 | 0.62 | 1.1 | 2.9 |
| Comparison Example 3[3] | 1.86 | 0.30 | 0.14 | 0.14 | 0.15 | 0.13 | 0.87 |
| Comparison Example 4[4] | 1.96 | 0.30 | 0.12 | 0.09 | 0.095 | 0.074 | 0.67 |
| Comparison Example 5[5] | 1.81 | 0.29 | 0.085 | 0.13 | 0.096 | 0.13 | 0.73 |
| Comparison Example 6[6] | 1.98 | 0.83 | 0.21 | 0.14 | 0.16 | 0.13 | 1.5 |
| Comparison Example 7[7] | 1.91 | 1.8 | 0.52 | 0.34 | 0.522 | 0.57 | 3.8 |
| Comparison Example 8[8] | 1.98 | 0.47 | 0.14 | 0.014 | 0.13 | 0.15 | 1.0 |

[1]GREEN LITE 2110 Powder (commercially available from 3M)
[2]Alkyd Duraline Thermoplastic Hot Applied Marking Material (commercially available from Morton International, Inc.)
[3]STAMARK 440 Tape (commercially available from 3M)
[4]STAMARK 420 Tape (commercially available from 3M)
[5]STAMARK 5730 Tape (commercially available from 3M)
[6]HOTAPE Preformed Marking Tape (commercially available from Stimsonite Corporation)
[7]PREMARK Preformed Marking Tape (commercially available from Flint Trading, Inc.)
[8]FLAMETAPE Preformed Marking Tape (commercially available from Magna Industries, Inc.)

The markers in Comparison Examples 3 through 8 were commercially available preformed pavement marking tapes. All of the Comparison Example materials are currently used widely throughout the U.S. for intersection pavement marking.

The wear resistance of each pavement marker was evaluated using a Taber Abraser Tester, Model 503 (Taber Industries) using procedures similar to those described in ASTM D4060-95. However, the tester was fitted with an H-22 abrasive wheel to provide for accelerated wear results, and volume loss rather than weight loss was reported. It should be noted that, as stated in the ASTM standard, the results of the Taber Abrasion test method have poor reproducibility, and that interlaboratory agreement is improved significantly when rankings of coatings are used in place of numerical values.

Every 500 cycles, the aluminum panels were removed from the tester and weighed to determine the extent of marker material wear loss. The wear test results are shown below in Table 1. The results assume a constant specific gravity throughout the test, although for some markers the specific gravity varied as the marker topcoat and other marker layers wore away. The pavement marker of Example 1 exhibited a lower volume loss at equivalent total test cycles than all but one of the commercially available comparison pavement marking materials shown in Table 1. This latter comparison marker lost its beads and topcoat before completion of the test.

The composition of Example 1 was applied to aged asphalt using the Model GLG-20 flame-spray striping machine. The stripe was applied transverse to the vehicle lane of a confidential roadway test deck and exposed to outdoor conditions in Minnesota for eleven months. Visual

EXAMPLE 2

A series of pavement marking materials was prepared, applied to aluminum panels by flame-spraying using the method of Example 1, and evaluated using the Taber Abraser Tester. Each material contained PRIMACOR 5990 ethylene acrylic acid copolymer (commercially available from Dow Chemical Co.), glass beads and $TiO_2$. The material of Run 2-2 also contained OMYACARB 6 calcium carbonate (commercially available from Omya, Inc.). The results are set out below in Table 2.

TABLE 2

| Run | Resin/glass beads/CaCO$_3$/TiO$_2$, volume percent | Calculated Specific Gravity, g/cm$^3$ | Total Volume Loss, cm$^3$ |
|---|---|---|---|
| 2-1 | 72.8/19.6/0/7.6 | 1.48 | 0.69 |
| 2-2 | 60.8/19.6/13.3/6.4 | 1.68 | 0.78 |

EXAMPLE 3

Using the method of Example 1, a series of pavement markers was prepared, applied to aluminum panels and evaluated. The markers of Runs 3-1 and 3-2 contained the same copolymer, ceramic microspheres, glass beads and $TiO_2$ used in Example 1, together with a light stabilizer (Chimassorb 944) and an antioxidant (IRGANOX 1010), in a 69/15/12/4.3/0.27/0.11 volume percent ratio. The marker of Run 3-1 was prepared by flame-spraying these ingredients onto an aluminum panel as in Example 1. The marker of Run 3-2 was formed into a film and hot-laminated to an aluminum panel using the method of Comparison Example 2.

The markers of Runs 3-3 and 3-4 were prepared using Nucrel 699 ethylene methacrylic acid polymer, glass beads, TiO$_2$, UV absorber and antioxidant in a 85/9.9/4.4/0.22/0.09 volume percent ratio. The marker of Run 3-3 was prepared by flame-spraying as in Example 1 and the marker of Run 3-4 was prepared by hot lamination using the same method used for Run 3-2. The markers were evaluated for wear resistance using a Taber Abraser Tester as described in Example 1. The results are shown below in Table 3, and illustrate that comparable ranking orders (albeit differing numerical volume loss figures) were obtained when markers prepared using flame-spraying were compared to markers prepared using hot lamination.

TABLE 3

| Run | Binder | Method of Application | Calculated Specific Gravity, g/cm$^3$ | Total Volume Loss, cm$^3$ |
| --- | --- | --- | --- | --- |
| 3-1 | 5990[1] | Flame spray | 1.48 | 0.95 |
| 3-2 | 5990 | Lamination | 1.48 | 0.58 |
| 3-3 | 699[2] | Flame spray | 1.24 | 0.36 |
| 3-4 | 699 | Lamination | 1.24 | 0.29 |

[1]PRIMACOR 5990 ethylene acrylic acid copolymer, commercially available from Dow Chemical Co
[2]NUCREL 699 ethylene methacrylic acid copolymer, commercially available from E. I du Pont de Nemours & Co.

EXAMPLE 4

A series of pavement markers containing varying types or amounts of alumina was prepared using the general method of Run 3-2. All of the components (including the glass beads) were dry blended and well mixed using a tumbler mixer, extrusion compounded using a co-rotating twin screw extruder, collected on silicone-coated release paper, cooled, broken into small pieces and re-extruded to attain more uniform mixing. The resulting re-extruded material was collected on silicone-coated paper, cooled and then hot-laminated to aluminum panels. The markers were evaluated for wear resistance using the method of Example 1. The results are shown below in Table 4. Markers containing alumina (Runs 4-1, 4-2 and 4-3) exhibited improved wear resistance compared to the marker prepared without alumina (Run 4-4).

TABLE 4

| Run | Alumina[1] Grit Size | Resin[2]/glass beads/ TiO$_2$/alumina, volume percent | Calculated Specific Gravity, g/cm$^3$ | Total Volume Loss, cm$^3$ |
| --- | --- | --- | --- | --- |
| 4-1 | 100 | 63.3/6.6/13.9/16.3 | 1.82 | 0.33 |
| 4-2 | 60 | 63.3/6.6/13.9/16.3 | 1.82 | 0.35 |
| 4-3 | 30 | 63.3/6.6/13.9/16.3 | 1.82 | 0.40 |
| 4-4 | None | 72.2/6.2/0/16.2 | 1.40 | 0.55 |

[1]DURALUM Special White 100/60/30 grit alumina, commercially available from Washington Mills
[2]PRIMACOR 5990 ethylene acrylic acid copolymer, commercially available from Dow Chemical Co.

EXAMPLE 5

A series of pavement marking materials containing varying types and amounts of ceramic microspheres or alumina filler was prepared, applied to aluminum panels using a pressure-sensitive film adhesive, and evaluated using the Taber Abraser Tester. The pressure sensitive film adhesive was employed because the materials exhibited relatively poor adhesion to aluminum. It is believed that their adhesion to typical pavement surfaces would be much better and would not require the use of a film adhesive. Each material contained ALMATEX PD-7610 epoxy functional acrylic copolymer (commercially available from Anderson Development Co.) together with TiO$_2$ and glass beads as in Example 1.

The results are shown below in Table 5, and illustrate that improved wear resistance was obtained by using ceramic microsphere fillers. Run 5-7, which contained no filler, fell apart in less than 1000 cycles. The addition of alumina (DURALUM Special White 60 grit alumina, commercially available from Washington Mills) in Run 5-6 provided a modest improvement in measured wear resistance. The addition of ceramic microspheres (Nos. W210, W410 and W610 ZEEOSPHERES Ceramic Microspheres, commercially available from 3M, and having respective maximum particle sizes of 12, 24 and 40 μm) markedly improved the measured wear resistance.

TABLE 5

| Run | Filler | Resin/glass beads/filler/TiO$_2$, volume % | Specific Gravity, g/cm$^3$ | Calculated Total Volume Loss, 2500 cycles, cm$^3$ |
| --- | --- | --- | --- | --- |
| 5-1 | W-210 | 63.3/16.2/13.9/6.5 | 1.74 | 2.5 |
| 5-2 | W-410 | 53.3/16.2/24/6.5 | 1.86 | 2.5 |
| 5-3 | W-410 | 63.3/16.2/13.9/6.5 | 1.74 | 2.3 |
| 5-4 | W-410 | 73.3/16.3/3.9/6.5 | 1.61 | 2.0 |
| 5-5 | W-610 | 63.3/16.2/13.9/6.5 | 1.74 | 2.3 |
| 5-6 | Alumina | 63.3/16.2/13.9/6.5 | 1.95 | Fell apart < 1500 cycles |
| 5-7 | None | 77.1/6.6/0/16.3 | 1.57 | Fell apart < 1000 cycles |

EXAMPLE 6

A series of pavement marking materials containing varying types and amounts of ceramic microspheres or alumina filler was prepared, applied to aluminum panels using the method of Example 5, and evaluated using the Taber Abraser Tester. Each material contained "Joncryl™" SCX-817 carboxyl functional acrylic copolymer (commercially available from SC Johnson Polymer) together with TiO$_2$ and glass beads as in Example 1.

The results are shown below in Table 6. Runs 6-1 through 6-5 illustrate the effect of alumina filler particle size and amount on wear resistance. Run 6-6 shows comparison data using ceramic microspheres ("Zeeospheres™ Ceramic Microspheres W-410, commercially available from 3M).

TABLE 6

| Run | Filler Type and Grit | Resin/glass beads/filler/TiO$_2$, volume % | Calculated Specific Gravity, g/cm$^3$ | Total Volume Loss, 2500 cycles, cm$^3$ |
| --- | --- | --- | --- | --- |
| 6-1 | Alumina-100 | 63.3/16.2/13.9/6.5 | 1.94 | 1.2 |
| 6-2 | Alumina-60 | 53.3/16.2/24/6.5 | 2.22 | 1.4 |
| 6-3 | Alumina-60 | 63.3/16.2/13.9/6.5 | 1.94 | 1.4 |
| 6-4 | Alumina-60 | 73.3/16.3/3.9/6.5 | 1.66 | 0.96 |
| 6-5 | Alumina-30 | 63.3/16.2/13.9/6.5 | 1.94 | 0.87 |
| 6-6 | W-410 | 63.3/16.2/13.9/6.5 | 1.72 | 1.5 |
| 6-7 | None | 77.4/6.6/0/16.1 | 1.55 | 1.0 |

EXAMPLE 7

A series of pavement marking materials containing combinations of various epoxy-functional acrylic copolymers with one or more additives was prepared, applied to aluminum panels using the method of Example 5, and evaluated using the Taber Abraser Tester. The additives were a polyurethane, a carboxyl-functional aliphatic polyester, and a crosslinking agent. Each gave improved performance. The materials of Runs 7-4, 7-7 and 7-9 were heated for 12 minutes at 193° to 200° C. to initiate crosslinking. The results are set out below in Table 7.

TABLE 7

| Run | Binder | Additive | Binder/Additive/ TiO$_2$, volume % | Calculated Specific Gravity, g/cm$^3$ | Total Volume Loss, 2500 cycles, cm$^3$ |
|---|---|---|---|---|---|
| 7-1 | 6100[1] | None | 93.4/0/6.6 | 1.28 | Fell apart <1500 cycles. |
| 7-2 | 6100 | L430.77-3[2] | 75.3/18/6.6 | 1.29 | 0.57 |
| 7-3 | 6100 | 8500[3] | 75.3/18/6.6 | 1.29 | 0.70 |
| 7-4 | 6100 | DDDA[4] | 84/9.3/6.9 | 1.34 | 0.79 |
| 7-5 | 6300[5] | None | 93.4/0/6.6 | 1.28 | Fell apart <300 cycles |
| 7-6 | 6300 | 8500 | 75.3/18/6.6 | 1.29 | 0.81 |
| 7-7 | 6300 | DDDA | 77.3/15.8/6.87 | 1.34 | 0.82 |
| 7-8 | 7610[6] | None | 93/0/7 | 1.36 | Fell apart <500 cycles |
| 7-9 | 7610 | DDDA | 77.3/15.8/6.87 | 1.34 | 0.84 |
| 7-10 | 815[7] | None | 93.1/0/6.9 | 1.34 | 0.97 |
| 7-11 | 815 | L430.77-3 | 74.5/18.6/6.9 | 1.34 | 0.48 |

[1]Almatex ™ 6100 epoxy functional acrylic, commercially available from Anderson Development Co.
[2]L430.77-3 thermoplastic aliphatic polyurethane, commercially available from Morton International
[3]AP-8500 linear carboxyl functional aliphatic polyester, commercially available from Anderson Development Co.
[4]1,12-Dodecanedioic acid, commercially available from E. I. DuPont
[5]Almatex ™ 6300 epoxy functional acrylic, commercially available from Anderson Development Co.
[6]Almatex ™ 7610 epoxy functional acrylic, commercially available from Anderson Development Co.
[7]Joncryl 815 carboxyl functional acrylic, commercially available from SC Johnson Polymer

EXAMPLE 8

A series of pavement marking materials containing combinations of various propylene polymers and curable epoxy resins was prepared, applied to aluminum panels using the general method of Run 3-2, and evaluated using the Taber Abraser Tester. Each material contained a polypropylene binder and an epoxy additive (both identified below), together with 3 weight % (based on the weight of the polypropylene) of a maleated polypropylene (GXX15 polypropylene, commercially available from Eastman Chemicals) and 0.5 weight percent (based on the weight of the polypropylene) of a UV absorber (TINUVIN 770 hindered amine light stabilizer, commercially available from Ciba-Geigy). The samples were pressed between silicone liners and maintained at 200° C. for 3 minutes during the hot lamination step to effect thermosetting of the epoxy. The results are set out below in Table 8.

TABLE 8

| Run | Binder | Additive | Binder/Additive/ TiO$_2$, volume % | Calculated Specific Gravity, g/cm$^3$ | Total Volume Loss, 2500 cycles, cm$^3$ |
|---|---|---|---|---|---|
| 8-1 | 3505[1] | ERL 4221[2] | 88/5.1/7.3 | 1.13 | 0.40 |
| 8-2 | 3505 | ERL 4221 | 82/10/7.3 | 1.15 | 0.45 |
| 8-3 | 3505 | Epon 1001F[3] | 71/21/8.3 | 1.19 | 0.40 |
| 8-4 | 1441[4] | ERL 4221 | 88/5.1/7.3 | 1.13 | 0.56 |
| 8-9 | 1441 | Epon 1001F | 88/5.1/7.3 | 1.13 | 0.55 |

[1]EXXON 3505 400 melt flow index polypropylene, commercially available from Exxon Chemical Co.
[2]ERL 4221 cycloaliphatic liquid epoxy resin, commercially available from Union Carbide Corp.
[3]EPON 1001F aromatic solid epoxy resin, commercially available from Shell Chemical Co.
[4]AMOCO 1441 1200 melt flow index polypropylene, commercially available from Amoco Chemical Co.

EXAMPLE 9

A 10:90 weight ratio dry powder blend of a curable epoxy resin powder and a polypropylene polymer powder was prepared, flame-sprayed onto aluminum panels using the general method of Example 1, and evaluated using the Taber Abraser Tester. The curable epoxy resin powder was EPON 1001F aromatic solid epoxy resin, commercially available from Shell Chemical Co. The polypropylene powder was AMOCO 1441 1200 melt flow index polypropylene, commercially available from Amoco Chemical Co. These two ingredients were mixed by tumbling. The resulting mixture had a calculated specific gravity of 0.92 g/cm$^3$. A Model 124 flame-spray system (commercially available from Plastic Flamecoat Systems) was used to apply the blend. The resulting coatings were postheated using the flame-spray apparatus for four different lengths of time ranging from zero to about ten seconds. The results are set out below in Table 9.

TABLE 9

| Run | Postheating time, seconds (approximate) | Color following postheating | Total Volume Loss, 2000 cycles, cm$^3$ |
|---|---|---|---|
| 9-1 | 0 | Clear | Fell apart < 30 cycles. |
| 9-2 | 3 | Clear | Fell apart < 20 cycles. |
| 9-3 | 6 | Beige | Fell apart < 1200 cycles. |
| 9-4 | 10 | Tan | 0.27 |

Various modifications and alterations of this invention will be apparent to those skilled in the art without departing from the scope and spirit of this invention. It should be understood that this invention is not limited to the illustrative embodiments set forth above.

What is claimed is:

1. A method for marking a transportation surface comprising the steps of:

a) heating the surface to a temperature above ambient temperature;

b) melting or otherwise substantially softening a finely-divided, free flowing, flame-sprayable, powder binder material selected from the group consisting of acrylic polymers and copolymers, olefin polymers and copolymers, olefin polymers and copolymers having a number average molecular weight greater than 10,000, urethane polymers and copolymers, curable epoxy resins, ester polymers and copolymers, and blends thereof;

c) applying the molten or softened binder to the surface together with a particulate topcoat or particulate filler selected from the group consisting of reflective elements, skid-resistant particles, magnetizable particles and mixtures thereof; and d) allowing the thus-applied materials to cool and form a marker in which the binder adheres directly to the surface.

2. A method according to claim 1, wherein the applied materials are postheated after they are applied to the surface.

3. A method according to claim 1, wherein the binder is thermosettable.

4. A method according to claim 1, wherein the binder comprises a blend.

5. A method according to claim 4, wherein the blend comprises olefin polymer or copolymer and curable epoxy resin.

6. A method according to claim 4, wherein the blend comprises an acrylic polymer or copolymer and one or more of a urethane or ester polymer or copolymer.

7. A method according to claim 4, wherein the blend comprises acrylic polymer or copolymer and ethylene acrylic acid or ethylene methacrylic acid copolymer.

8. A method according to claim 1, wherein the marker comprises two or more layers, with at least the layer adjacent the transportation surface having such binder adhered directly to such surface.

9. A method according to claim 1, wherein the binder comprises an ethylene acrylic acid or ethylene methacrylic acid copolymer and the particulate filler or particulate topcoat comprise reflective elements and skid-resistant particles.

* * * * *

UNITED STATES PATENT AND TRADEMARK OFFICE
CERTIFICATE OF CORRECTION

PATENT NO. : 6,217,252 B1
DATED : April 17, 2001
INVENTOR(S) : Howard R. Tolliver et al.

It is certified that error appears in the above-identified patent and that said Letters Patent is hereby corrected as shown below:

<u>Title page,</u>
Item [57], ABSTRACT, please add -- "kit, marker and marked transportation surface" -- after "method".

<u>Column 10,</u>
Line 21, please add -- . -- after "thereof".

Signed and Sealed this

Sixteenth Day of April, 2002

Attest:

JAMES E. ROGAN
*Attesting Officer*  *Director of the United States Patent and Trademark Office*